(12) United States Patent
Guido

(10) Patent No.: US 12,031,034 B2
(45) Date of Patent: *Jul. 9, 2024

(54) WATER SOLUBLE CONTAINER

(71) Applicant: Terry Guido, Dallas, TX (US)

(72) Inventor: Terry Guido, Dallas, TX (US)

( * ) Notice: Subject to any disclaimer, the term of this patent is extended or adjusted under 35 U.S.C. 154(b) by 404 days.

This patent is subject to a terminal disclaimer.

(21) Appl. No.: 17/018,118

(22) Filed: Sep. 11, 2020

(65) Prior Publication Data

US 2020/0407138 A1 Dec. 31, 2020

Related U.S. Application Data

(63) Continuation of application No. 15/443,753, filed on Feb. 27, 2017, now Pat. No. 10,822,149.

(60) Provisional application No. 62/357,857, filed on Jul. 1, 2016.

(51) Int. Cl.
| | |
|---|---|
| *B65D 65/46* | (2006.01) |
| *B65D 3/04* | (2006.01) |
| *B65D 3/22* | (2006.01) |
| *B65D 3/28* | (2006.01) |
| *C08L 89/00* | (2006.01) |

(52) U.S. Cl.
CPC .............. *C08L 89/00* (2013.01); *B65D 3/04* (2013.01); *B65D 3/22* (2013.01); *B65D 3/28* (2013.01); *B65D 65/466* (2013.01)

(58) Field of Classification Search
CPC ... B65D 3/04; B65D 3/22; B65D 3/28; B65D 65/466; B65D 15/08; B65D 15/24; B65D 3/08; B65D 5/064; B65D 5/4266; B65D 5/4279; C08L 3/02; C08L 89/00; C08L 93/02; Y02W 90/10; Y02W 90/14; D21H 19/84; D21H 27/10; C08J 2300/14; C08J 2300/16; C08J 2329/04; C08J 2403/02; C08J 2489/00; C08J 2493/02; C08J 7/0427; B32B 2439/70; B32B 27/10
See application file for complete search history.

(56) References Cited

U.S. PATENT DOCUMENTS

| | | | |
|---|---|---|---|
| 3,606,262 A | 9/1971 | Hoff | |
| 5,620,724 A | 4/1997 | Adler | |
| 5,798,152 A | 8/1998 | Stevens | |
| 7,311,243 B1 * | 12/2007 | Konzal | B65D 3/14 |
| | | | 229/4.5 |
| 8,245,848 B2 | 8/2012 | Tolibas-Spurlock et al. | |
| 8,701,905 B2 | 4/2014 | Warner | |
| 8,991,635 B2 | 3/2015 | Myerscough | |
| 9,090,372 B2 | 7/2015 | Warner | |

(Continued)

FOREIGN PATENT DOCUMENTS

JP H05239244 A 9/1993

*Primary Examiner* — Yan Lan
(74) *Attorney, Agent, or Firm* — Goodhue, Coleman & Owens, P.C.

(57) ABSTRACT

A container that dissolves. A shell defining the container sized to accommodate a volume of a consumable. The shell is water soluble. The shell defines walls extending upward from a closed bottom. The container includes a first water insoluble layer coating an exterior surface of the walls of the shell. One or more portions of the exterior surface are not coated with the first water insoluble layer promoting the dissolution of the container. The container includes a second water insoluble layer coating an interior of the shell.

20 Claims, 4 Drawing Sheets

(56) References Cited

U.S. PATENT DOCUMENTS

| | | |
|---|---|---|
| 9,126,717 B2 | 9/2015 | Myerscough |
| 10,822,149 B1 * | 11/2020 | Guido .................. D21H 19/84 |
| 2003/0216492 A1 | 11/2003 | Bowden et al. |

* cited by examiner

WATER SOLUBLE CONTAINER

RELATED APPLICATION

This application is continuation of U.S. application Ser. No. 15/443,753 filed on Feb. 27, 2017 which claims priority to provisional patent application U.S. Ser. No. 62/357,857 filed on Jul. 1, 2016 entire content of which are herein incorporated by references.

BACKGROUND

The embodiments herein relate generally to consumer products, and more particularly, to a water soluble, biodegradable beverage container that dissolves in water over time.

Recyclable containers made from plastic, paper, or Styrofoam exist. However, conventional disposable, biodegradable beverage containers create waste and are costly to recycle.

Therefore, what is needed is a biodegradable, eco-friendly, beverage container that mostly (up to about 90%) dissolves in water after a predetermined, but relatively short, period of time and minimizes recycling costs.

SUMMARY

One embodiment provides a container that dissolves. A shell defining the container sized to accommodate a volume of a consumable. The shell is water soluble. The shell defines walls extending upward from a closed bottom. The container includes a first water insoluble layer coating an exterior surface of the walls of the shell. One or more portions of the exterior surface are not coated with the first water insoluble layer promoting the dissolution of the container. The container includes a second water insoluble layer coating an interior of the shell.

Another embodiment provides a container that dissolves. A shell defining the container sized to accommodate a volume of a consumable. The shell includes an interior layer and an exterior layer with at least one uncoated edge. The shell is water soluble. The shell defines walls extending upward from a closed bottom. A first water insoluble layer coats an exterior surface of the walls of the shell. One or more portions of the exterior surface including a closed bottom are uncoated with the first water insoluble layer to promote the dissolution of the container. The closed bottom connects to the shell. A second water insoluble layer coats an interior of the shell.

Yet another embodiment provides a container. A shell defines at least a portion of the container is sized to accommodate a volume of a consumable. The shell defines walls extending upward from a closed bottom. A water insoluble layer coats an exterior surface of the walls of the shell. One or more portions of the exterior are uncoated with the water insoluble layer promoting dissolution of the container after use. The water insoluble layer coats an interior of the shell.

Some embodiments of the present disclosure include a biodegradable and dissolvable container. The container may comprise a biodegradable and water soluble shell defining the container sized to accommodate a volume of a liquid, the shell having walls extending upward from a closed bottom; an exterior water insoluble layer coating an exterior surface of the walls of the shell; and an inner water insoluble layer coating an interior of the shell, wherein the container may completely dissolve in water over a predetermined period of time.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a beverage container that biodegrades and dissolves completely in water and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

1. Biodegradable Water Insoluble Coating
2. Water Soluble and Biodegradable Substrate Layer
3. Optional Biodegradable Water Soluble Pigment The various elements of the device of the present disclosure may be related in the following exemplary fashion. It is not intended to limit the scope or nature of the relationships between the various elements and the following examples are presented as illustrative examples only.

Figure 1:
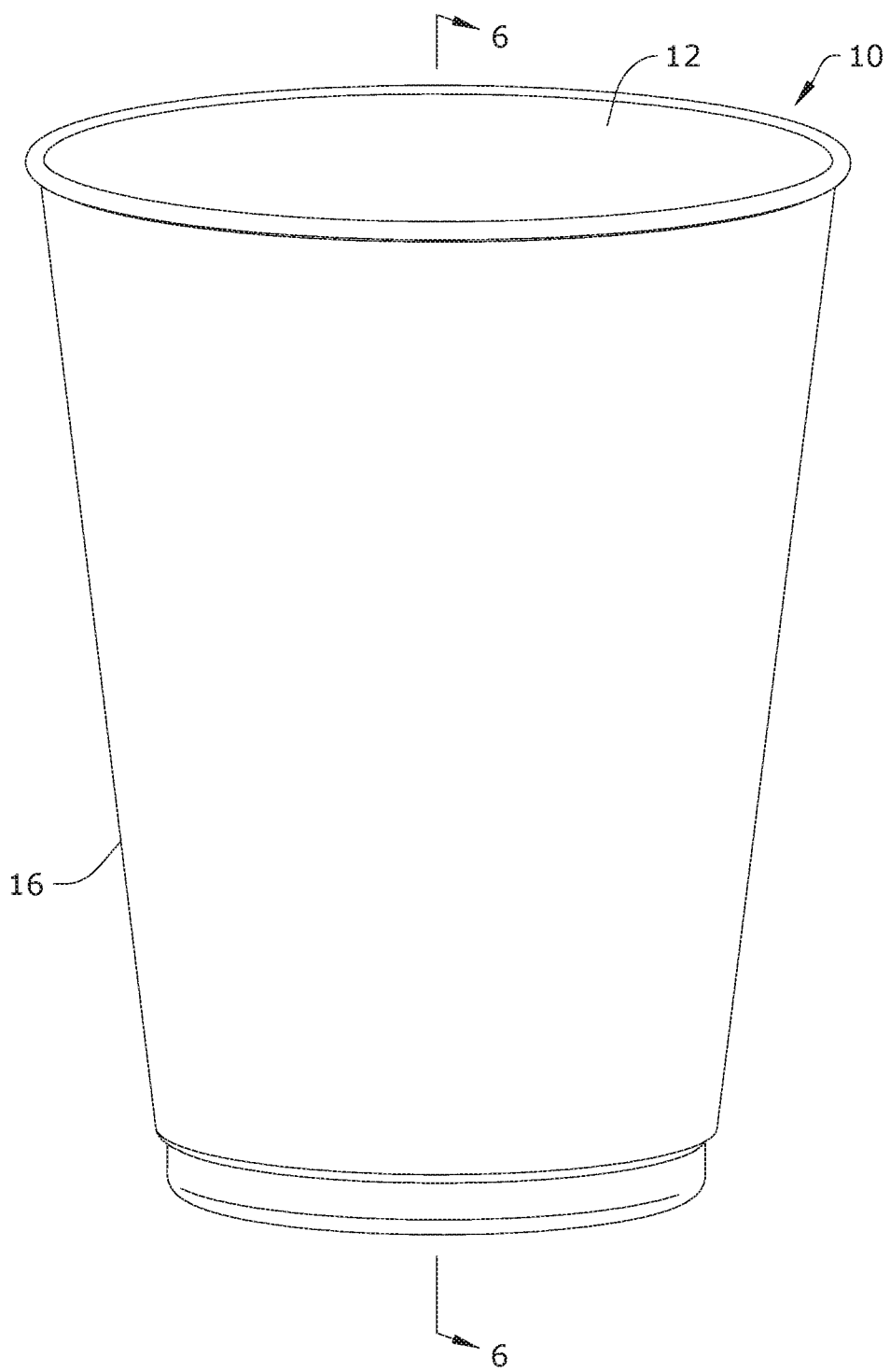
FIG. 1 is a perspective view of one embodiment of the present disclosure.
Figure 2:
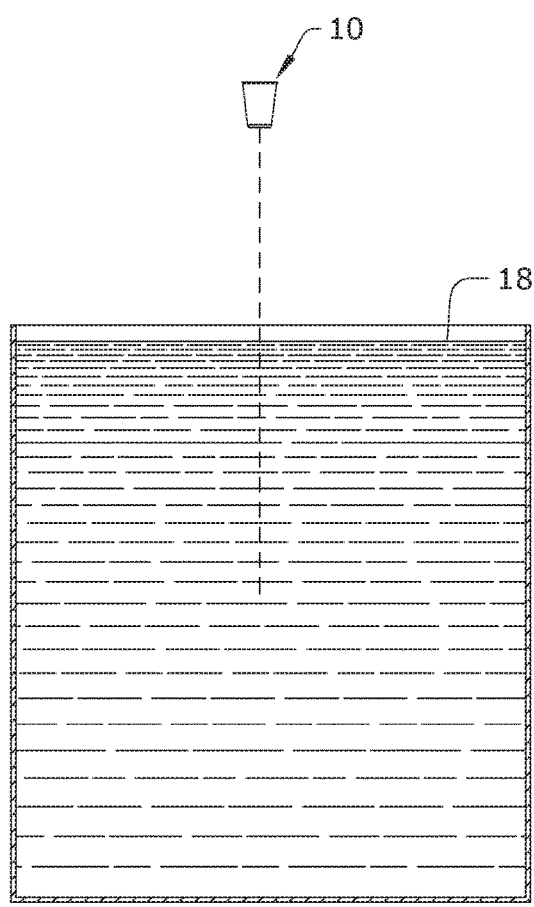
FIG. 2 is an exploded section view of one embodiment of the present disclosure.
Figure 3:
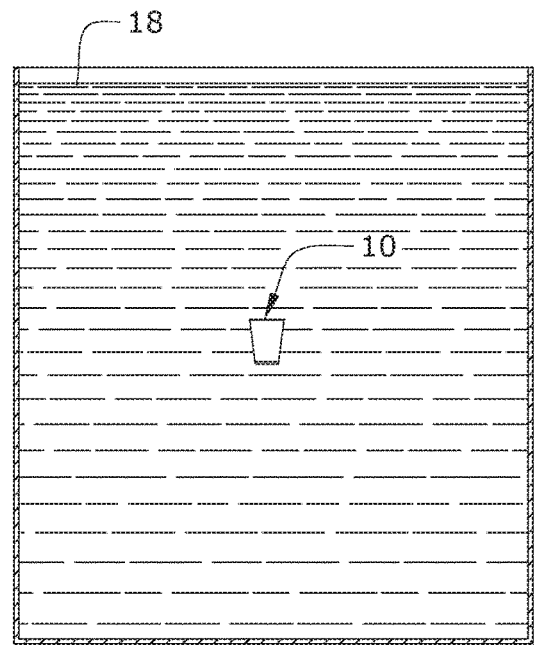
FIG. 3 is a section view of one embodiment of the present disclosure.
Figure 4:
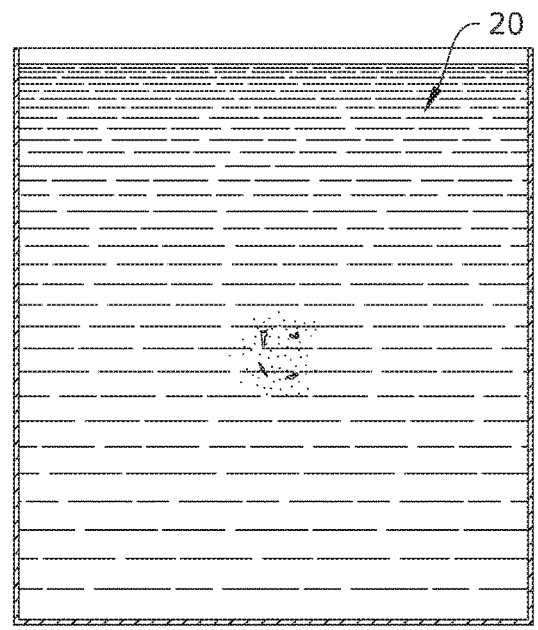
FIG. 4 is a section view of one embodiment of the present disclosure.
Figure 5:
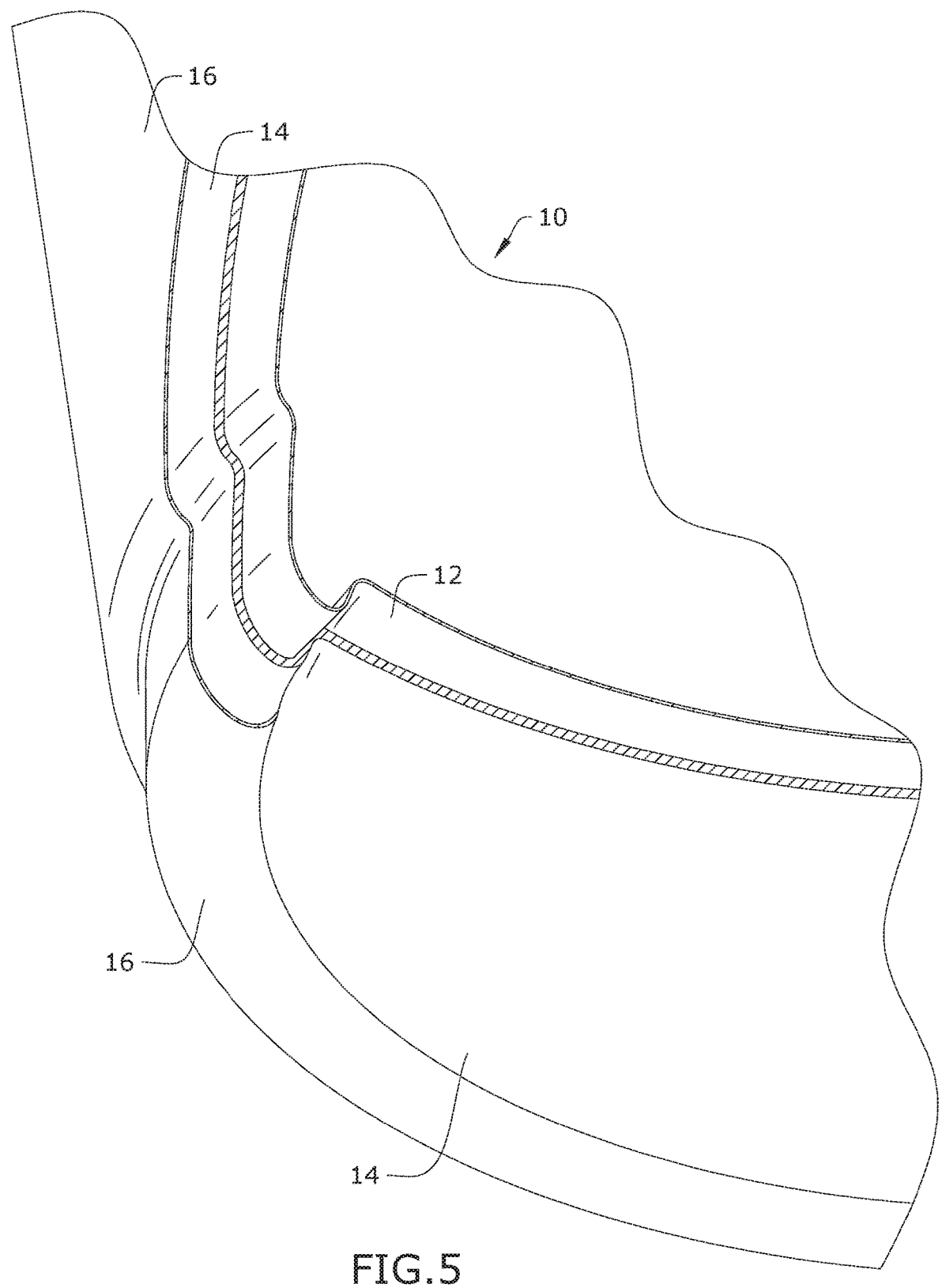
FIG. 5 is a cutaway view of one embodiment of the present disclosure.
Figure 6:
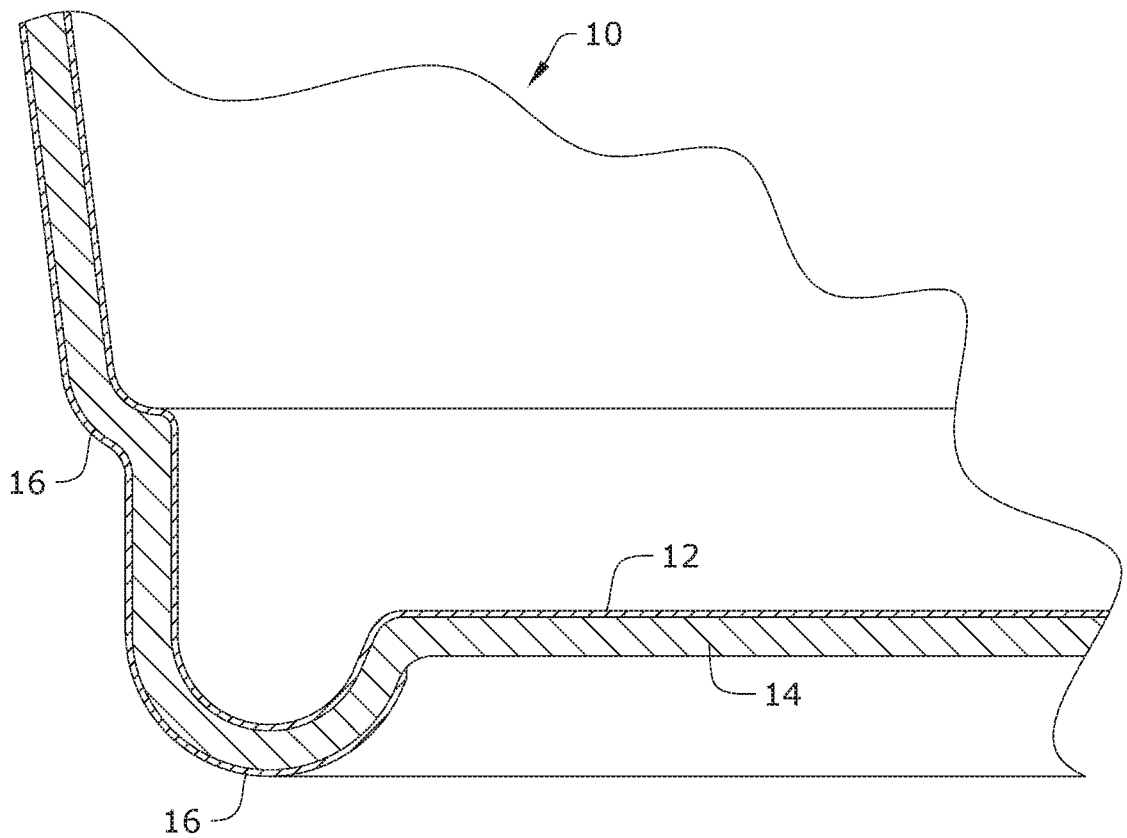
FIG. 6 is a section detail view of one embodiment of the present disclosure, taken along line 6-6 in FIG. 1.

By way of example, and referring to FIGS. 1-6, some embodiments of the present disclosure include a container 10 that dissolves in water and whose remnants are biodegradable, the container 10 comprising a biodegradable and water soluble shell 14 defining the container 10 sized to accommodate a volume of a liquid, the shell 14 comprising walls extending upward from a closed bottom; an exterior water insoluble layer 16 coating an exterior surface of the walls of the shell 14; and an inner water insoluble layer 12 coating an interior of the shell 14. Thus, the exterior surface of the bottom of the shell 14 may not be coated with the exterior water insoluble layer 16. In some embodiments, the container 10 may be designed to dissolve in water 18 over a predetermined period of time, resulting in a mixture 20 of water 18 and biodegradable materials.

The container 10 of the present disclosure may be made of any suitable materials. In some embodiments, the biodegradable and dissolvable shell 14 may comprise an eco-friendly, biodegradable and water soluble material, such as polyvinyl alcohol, polyvinyl acetate, and dissolvable paper, such as SMARTSOLVE brand dissolvable paper.

In embodiments, the exterior water insoluble layer 16 and the interior water insoluble layer 12 may comprise the same or different materials. For example, the water insoluble layers 12, 16 may each independently comprise a corn based sealant, such as FloChemical Zein; a sealant, such as ZINSSER brand Sealcoat; or shellac. The exterior water insoluble layer 16 may be mixed with a water soluble pigment, such as a vegetable oil or cornstarch based pigment. Alternatively, a layer of a biodegradable, water insoluble pigment may be sandwiched between the exterior water insoluble layer 16 and the shell 14. In any case, the pigment and the interior and exterior layers may comprise materials that do not initiate the dissolution of the shell 14.

The container 10 of the present disclosure may have any desired shape and size and, in some embodiments, may resemble a beverage container, such as a pint glass. The bottom surface of the container may comprise a raised center portion and a protruding circumference lip extending downward from the raised center portion, wherein the raised center portion may not be coated with the exterior water insoluble layer 16, but the protruding circumference lip may be coated with the exterior water insoluble layer 16. This lip may help prevent the container 10 from beginning to inadvertently biodegrade when the container 10 is placed on a moist or wet surface, such as a table. In a specific example, the lip may keep the raised center portion of the container 10 at least about ⅛" above a table surface. The thickness of the walls of the container 10 may vary, and in some embodiments, may be from about 0.010" to about 0.050", which may be enough to provide structural integrity.

The container 10 of the present disclosure may be manufactured using any suitable method. In some embodiments, such as when the container 10 comprises plastic, the container 10 may be 3D printed, which includes sterolithography, fused deposition modeling, selective laser sintering, selective laser melting, and the like. Alternatively, the container 10 may be molded using, for example, injection molding, vacuum molding, or any other suitable molding method to make a container. In embodiments in which the container 10 comprising the dissolvable paper, a conventional cutting and assembly, such as those used to make conventional paper cups, may be performed, wherein the seams may be sealed or adhered using a non-toxic, biodegradable adhesive, such as MASTERBOND food grade epoxy.

Once the shell 14 is formed into the desired size and shape, the interior water insoluble layer 12 may be coated onto the interior surface of the shell. The inner layer 12 may be applied using any method suitable for obtaining the desired thickness, including brushing, spraying, dipping, swirling, and the like. For example, a corn-based sealant, sealant, or shellac layer may be applied by pouring the coating on the interior of the container 10 and swirling until all of the interior surfaces are covered with a coating of approximately 0.001" in thickness. The coating may be allowed to air dry for several hours and then hot air may be applied to the interior of the container 10 at a temperature of from about 180° F. to about 250° F. for a duration of about 5 to 10 minutes (to denature the com-based coating). These steps may be repeated several times until an overall thickness of about 0.005" is achieved uniformly. This thickness may correspond to approximately 2 hours of waterproof effectiveness.

Before the exterior layer 16 is applied, the bottom surface of the container 10 may be masked to prevent the exterior layer 16 from coating this area. Alternatively, another area of the exterior surface of the shell 14 may be masked and, thus, left uncoated. The exterior layer 16 may be applied until a minimum thickness of about 0.005" is achieved. The exterior layer 16 may be applied using any suitable method, such as brushing. Once the exterior layer 16 is applied, the masking may be removed from the shell 14.

To coat the exterior of a dissolvable paper shell 14 with a corn-based sealant, a plasticizer, such as any fatty oil like olive oil or canola oil, may be added to the corn-based sealant. The plasticizer may be added in an amount equal to the amount of Zein, by weight. For example, in a 10% zein/ethanol solution, 10% by weight of the plasticizer should be added.

To use the container 10 of the present disclosure as, for example, a beverage container, the user may pour liquids and ice into the container 10. The liquid may remain in the container 10 for approximately 2 hours before the container 10 starts dissolving or breaking down. Once the user has finished with the container 10, any remaining contents may be discarded and the container 10 may be placed in a bath of water 18. It may be preferred that the water 18 be warmer than about 20° C. and that the volume of water be at least about 4 to 5 times greater than the volume of the container 10. Additionally heat and water agitation may decrease the time required to dissolve/degrade the container 10. As the container 10 reacts with the water, the uncoated surface of the container 10 starts to dissolve, usually in about 15 minutes to 1 hour. The bottom may detach from the remaining portion of the container, exposing an uncoated edge of the container. Water may then begin to travel between the interior layer 12 and exterior layer 16 through the shell 14, which will begin to dissolve. As the shell 14 dissolves, the structural integrity holding the interior layer 12 and exterior layer 16 together begins to degrade and the thin coating layers 12, 16 begin to fall off in pieces and continue to break down over time (months). The water 18 thus becomes a mixture 20 of water 18 and dissolved plastic or paper and the water insoluble coating remnants, which may be considered non-toxic, biodegradable, and eco-friendly. As a result, the entire mixture 20 may be discarded to the environment.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A container that dissolves comprising:
    a shell defining the container sized to accommodate a volume of a consumable, wherein the shell is water soluble, and wherein the shell defines walls extending upward from a closed bottom to an open top;
    a first water insoluble layer coating an exterior surface of the walls of the shell, wherein one or more defined portions of the exterior surface are not coated with the first water insoluble layer to promote the dissolution of the container; and
    a second water insoluble layer coating an interior of the shell.

2. The container of claim 1, wherein the container is designed to dissolve in a liquid beginning with the one or more defined portions.

3. The container of claim 1, wherein the one or more defined portions are a side or a closed bottom of the shell.

4. The container of claim 1, wherein the container once dissolved is biodegradable.

5. The container of claim 1, wherein the shell comprises a member selected from the group consisting of polyvinyl alcohol, polyvinyl acetate, and dissolvable paper.

6. The container of claim 1, wherein the first water insoluble layer comprise a member selected from the group consisting of a corn-based sealant, a sealant, and a shellac.

7. The container of claim 1, wherein the first water insoluble layer and the second water insoluble layer comprises a member selected from the group consisting of zein, a sealant, and a shellac.

8. The container of claim 1, wherein the shell includes an interior layer and an exterior layer, wherein the exterior layer is coated with the first water insoluble layer, and wherein the interior layer is coated with the second water insoluble layer.

9. The container of claim 1, wherein the closed bottom includes a raised center portion and a protruding lip extending downward from the raised center portion.

10. The container of claim 1, wherein the container is molded into one of a plurality of shapes.

11. The container of claim 10, wherein seams of the container between the walls and the closed bottom are sealed utilizing a biodegradable adhesive.

12. The container of claim 1, wherein the walls have an overall thickness of from about 0.01 inches to about 0.05 inches.

13. The container of claim 1, wherein a thickness of the second water insoluble layer corresponds to approximately 2 hours of waterproof effectiveness.

14. A container that dissolves comprising:
a shell defining the container sized to accommodate a volume of a consumable, wherein the shell includes an interior layer and an exterior layer with at least one uncoated edge, wherein the shell is water soluble, and wherein the shell defines walls extending upward from a closed bottom to an open top;

a first water insoluble layer coats an exterior surface of the walls of the shell, wherein one or more defined portions of the exterior surface including a closed bottom are uncoated with the first water insoluble layer to promote the dissolution of the container, wherein the closed bottom connects to the shell; and a second water insoluble layer coats an interior of the shell.

15. The container of claim 14, wherein a thickness of the second water insoluble layer corresponds to approximately 2 hours of waterproof effectiveness.

16. The container of claim 14, wherein the container is molded into one of a plurality of shapes, wherein the container dissolves in a liquid beginning with the one or more defined portions, and wherein the container is biodegradable when dissolved.

17. The container of claim 14, wherein the walls have an overall thickness of from about 0.01 inches to about 0.05 inches, and wherein the water insoluble layer has a thickness of at least 0.005 inches.

18. The container of claim 14, wherein the closed bottom includes a raised center portion and a protruding lip extending downward from the raised center portion.

19. The container of claim 14, wherein seams of the container between at least the shell and the closed bottom are sealed utilizing a biodegradable adhesive.

20. A container comprising:
a shell defining at least a portion the container is sized to accommodate a volume of a consumable, wherein the shell defines walls extending upward from a closed bottom to an open top;

a water insoluble layer coats an exterior surface of the walls of the shell, wherein one or more defined portions of the exterior are uncoated with the water insoluble layer promoting dissolution of the container after use; and the water insoluble layer coats an interior of the shell.

\* \* \* \* \*